(12) United States Patent
Shen et al.

(10) Patent No.: US 10,933,605 B2
(45) Date of Patent: Mar. 2, 2021

(54) VIBRATION DAMPING SYSTEM

(71) Applicant: The Gill Corporation, El Monte, CA (US)

(72) Inventors: Hongbin Shen, Arcadia, CA (US); Phu Nguyen, Huntington Beach, CA (US)

(73) Assignee: The Gill Corporation, El Monte, CA (US)

( * ) Notice: Subject to any disclaimer, the term of this patent is extended or adjusted under 35 U.S.C. 154(b) by 546 days.

(21) Appl. No.: 15/217,824

(22) Filed: Jul. 22, 2016

(65) Prior Publication Data
US 2018/0022056 A1    Jan. 25, 2018

(51) Int. Cl.
| | |
|---|---|
| *B32B 3/12* | (2006.01) |
| *B29D 24/00* | (2006.01) |
| *B29C 70/66* | (2006.01) |
| *F16F 1/37* | (2006.01) |
| *B05D 1/02* | (2006.01) |
| *B32B 7/12* | (2006.01) |
| *B64C 1/00* | (2006.01) |
| *B64C 1/40* | (2006.01) |

(52) U.S. Cl.
CPC .................. *B32B 3/12* (2013.01); *B05D 1/02* (2013.01); *B29C 70/66* (2013.01); *B29D 24/005* (2013.01); *B32B 7/12* (2013.01); *B64C 1/00* (2013.01); *B64C 1/40* (2013.01); *F16F 1/37* (2013.01); *B32B 2255/26* (2013.01); *B32B 2305/024* (2013.01); *B32B 2307/56* (2013.01)

(58) Field of Classification Search
CPC .... B32B 3/12; B32B 7/12; B05D 1/02; B29C 70/66; B29D 24/005; B64C 1/40; F16F 1/37
See application file for complete search history.

(56) References Cited

U.S. PATENT DOCUMENTS

| | | | |
|---|---|---|---|
| 3,399,104 A | * | 8/1968 | Ball, III ................. B32B 15/08 114/267 |
| 3,931,448 A | | 1/1976 | Parkinson |

(Continued)

FOREIGN PATENT DOCUMENTS

| | | |
|---|---|---|
| AU | 2002100782 A4 | 5/2003 |
| DE | 8330458 U1 | 1/1984 |

(Continued)

OTHER PUBLICATIONS

Sperling, L. H. Sound and Vibration Damping with Polymer. Chapter 1. American Chemical Society. (Year: 1990).*

(Continued)

*Primary Examiner* — John E Uselding
(74) *Attorney, Agent, or Firm* — Jeffrey G. Sheldon; Katherine B. Sales; Cislo & Thomas LLP

(57) ABSTRACT

A reduced vibration structure comprises honeycomb and a vibration damping coating on at least a portion of the internal surface of at least a portion of the cells of the honeycomb. The vibration damping coating is formed by curing a coating composition comprising acrylic polymer or copolymer emulsion and a vibration damping filler. The structure can include an adhesive coupled to both the upper surface and the lower surface of the honeycomb and two pieces of sheathing coupled to the adhesive, one on the upper surface and one on the lower surface of the honeycomb.

22 Claims, 2 Drawing Sheets

(56) References Cited

U.S. PATENT DOCUMENTS

| | | | |
|---|---|---|---|
| 5,338,599 A | 8/1994 | Barrett | |
| 5,368,916 A | 11/1994 | Fujimoto et al. | |
| 5,536,556 A | 7/1996 | Juriga | |
| 5,945,643 A * | 8/1999 | Casser | B29C 70/086 |
| | | | 181/208 |
| 5,965,249 A | 10/1999 | Sutton et al. | |
| 6,326,074 B1 | 12/2001 | Takahashi | |
| 6,686,033 B1 | 2/2004 | Chacko | |
| 7,485,687 B2 | 2/2009 | Iseki et al. | |
| 7,601,654 B2 | 10/2009 | Bhatnagar et al. | |
| 7,861,477 B2 | 1/2011 | Donetti et al. | |
| 7,973,106 B2 | 7/2011 | Fisk et al. | |
| 8,426,525 B2 | 4/2013 | Nozue et al. | |
| 8,664,286 B2 | 3/2014 | Yasui et al. | |
| 2008/0182067 A1 | 7/2008 | Shen et al. | |
| 2009/0293413 A1* | 12/2009 | Donetti | C09D 119/003 |
| | | | 52/741.4 |
| 2010/0297439 A1 | 11/2010 | Takayama et al. | |
| 2011/0089183 A1 | 4/2011 | Gundelsheimer | |
| 2012/0153242 A1* | 6/2012 | Le Bonte | B29C 44/1228 |
| | | | 252/606 |
| 2013/0021215 A1 | 1/2013 | Suzuki et al. | |
| 2014/0266850 A1 | 9/2014 | Suorsa | |
| 2014/0275388 A1 | 9/2014 | Rokowski et al. | |
| 2014/0295175 A1 | 10/2014 | Kishikawa et al. | |

FOREIGN PATENT DOCUMENTS

| | | | | |
|---|---|---|---|---|
| WO | 2006084117 A3 | 8/2006 | | |
| WO | WO-2014140071 A1 * | 9/2014 | | C08L 95/00 |

OTHER PUBLICATIONS

Patent Cooperation Treaty, "International Search Report" for PCT/US2017/040099 dated Oct. 10, 2017, 4 pages.

European Patent Office and Patent Cooperation Treaty, "Written Opinion of the International Searching Authority," for PCT/US2017040099, 7 pages, dated Oct. 10, 2017.

Office Action dated Apr. 4, 2019 issued by the Moroccan Patent Office.

SUZORITE®, For structural vibration damping, improved mechanical properties and GF replacement. IMERYS Performance Additives. https://www.imerys-performance-additives.com/your-market/plastics/suzorite.

* cited by examiner

VIBRATION DAMPING SYSTEM

BACKGROUND

In the field of aerospace, there is need for reducing vibration and sound transmission throughout an aircraft. Vibration and background noise are uncomfortable for passengers and the vibration can cause mechanical stress on components.

Adding weight to aircraft is undesirable due to increased fuel consumption associated with increased weight. Also, adding weight to an airplane can increase the distance required for take-off and landing, and reduce air speed.

Accordingly, there is a need for an improved vibration damping structure for aircraft that minimizes weight added by the damping component.

SUMMARY

The present invention satisfies this need. The invention is for a system that comprises improved vibration damping structures and methods for fabricating the same. The structure comprises honeycomb having opposed surfaces and a plurality of open cells, each cell having an internal surface. The structure includes a vibration damping coating on at least some of the internal surface of some of the cells, and preferably on substantially the entire internal surface of substantially all of the cells.

The coating is formed by curing a coating composition comprising an acrylic polymer or copolymer emulsion comprising polymeric particles and a vibration damping filler. The weight ratio of vibration damping filler to polymeric particles is typically from 2:1 to 8:1. The vibration damping filler comprises at least 15% by weight of the composition. The structure comprises sufficient damping coating that vibration transmission is reduced as measured by one or more of:
   a. vibrational damping loss factor as measured by ASTM E756 is at least 0.05 higher than the structure without the vibration damping coating; or
   b. sound transmission loss as measured by ASTM E90 is at least about 5 decibels higher than the structure without the vibration damping coating, and typically up to about 20 decibels higher.

The vibration damping filler can comprise mica, and optionally can consist essentially of mica. The mica can comprise a plurality of particles where no more than 3% by weight of the particles are greater than 300 microns in diameter.

The structure usually comprises for aircraft applications an adhesive coupled to both surfaces of the honeycomb, and a piece of sheathing for both surfaces of the honeycomb coupled to the honeycomb by the adhesive. The adhesive can comprise a thermoset polymer adhesive film.

The sheathing can be formed from aluminum or fiber reinforced polymer. Each piece of sheathing can be from about 0.005 inches to about 0.1 inches in thickness.

Because aircraft components can be exposed to very low temperatures, preferably the acrylic polymer or acrylic copolymer has a glass transition temperature of from about −40° C. to about 0° C.

Preferably the acrylic polymer or acrylic copolymer emulsion has a viscosity less than 800 centipoise measured by Brookfield spindle #3 under 73° F. and 10 revolutions per minute.

The vibration damping coating can be from about 0.002 inches to about 0.015 inches thick.

The structure can be of any size, but typically is made into 4 feet wide by 8 or 12 feet long before machined down to dimensions of airplane floor parts.

BRIEF DESCRIPTION OF THE DRAWINGS

These and other features, aspects and advantages of the present invention will become better understood with reference to the following description, appended claims, and accompanying drawings where:

DESCRIPTION

As used herein, the following terms and variations thereof have the meanings given below, unless a different meaning is clearly intended by the context in which such term is used.

Definitions of chemical terms and general terms used throughout the specification are described in more detail herein, but unless otherwise indicated the chemical elements are identified in accordance with the Periodic Table of the Elements, CAS version, Handbook of Chemistry and Physics, 75th Ed., inside cover, and specific functional groups if not specifically described herein are described by general principles of organic chemistry, as well as specific functional moieties and reactivity, as described in Organic Chemistry, 4th Edition, L. G. Wade, Jr., Prentice-Hall Inc., New Jersey, 1999.

The term "solution" refers to a composition comprising a solvent and a solute, and includes true solutions and suspensions. Examples of solutions include a solid, liquid or gas dissolved in a liquid and particulates or micelles suspended in a liquid.

The term "emulsion" refers to a fine dispersion of minute droplets (acrylic copolymers) being dispersed in water by aid of surfactants (like soap), a term to differentiate from solution or blend.

The term "ASTM E756" refers to the ASTM test of that number as of the effective filing date of this application using the following parameters: a specimen in shape of FIG. 2a of the ASTM test with a height of 0.4 inches for a damped structure and non-damped structure is tested at a frequency of 1,800 Hz at ambient room temperature and ambient humidity. The material is aged enough to be used as a panel before testing, at ambient room temperature and ambient room humidity. The result of the test is "Peak Loss Factor."

The term "ASTM E90" refers to the ASTM test of that number as of the effective filing date of this application using the following parameters: a specimen with a thickness or height of 0.4 inches for a damped structure and non-damped structure is tested at a noise frequency of 1,000 Hz at ambient room temperature and ambient room humidity. The material tested is aged enough to be used as a panel before testing, at ambient room temperature and ambient room humidity. The result of the test is "Sound Transmission Loss (STL)."

Figure 1:
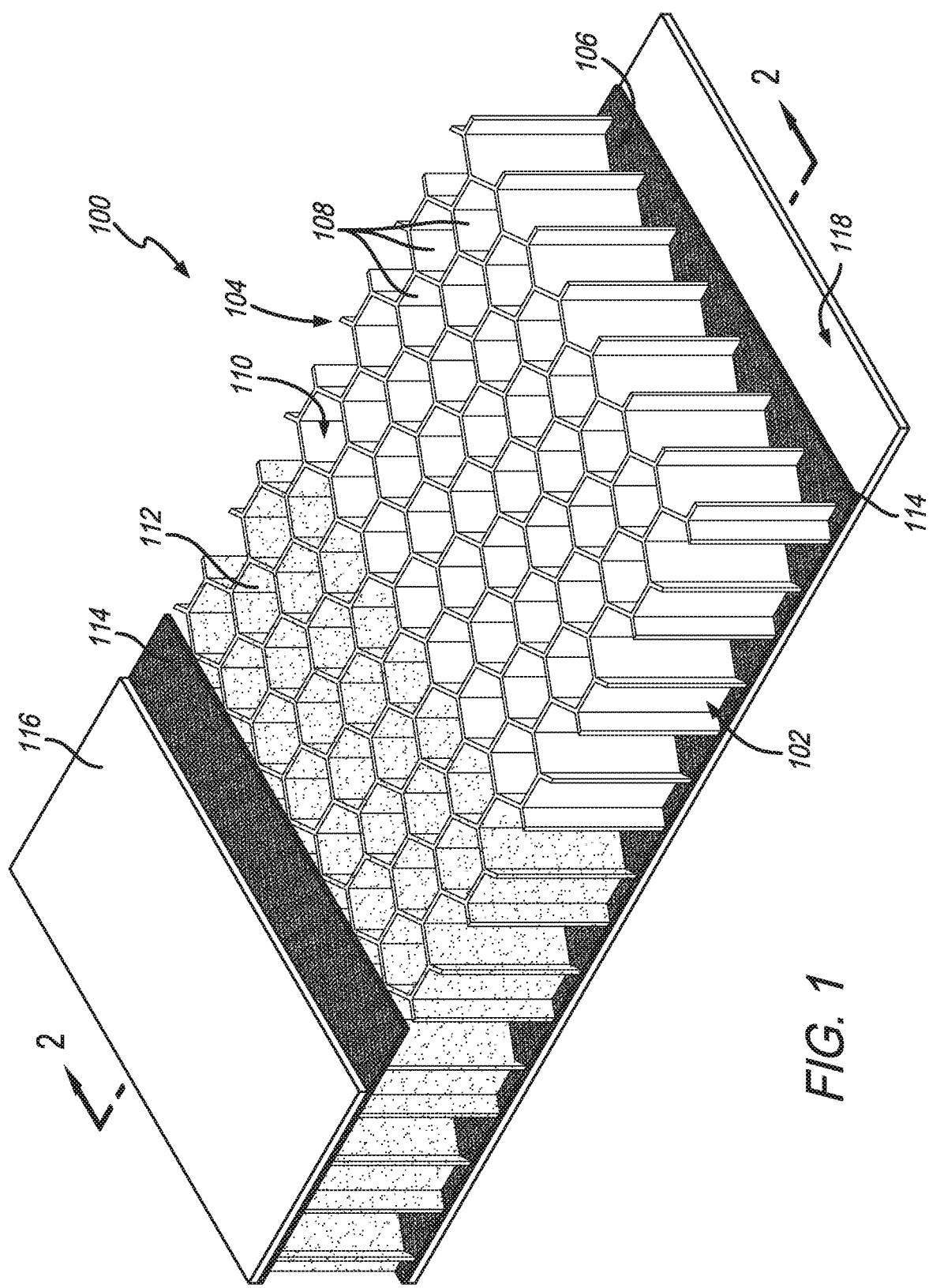
FIG. 1 is a perspective view of a structure, having features of the present invention, wherein the layers are partially removed.
Figure 2:
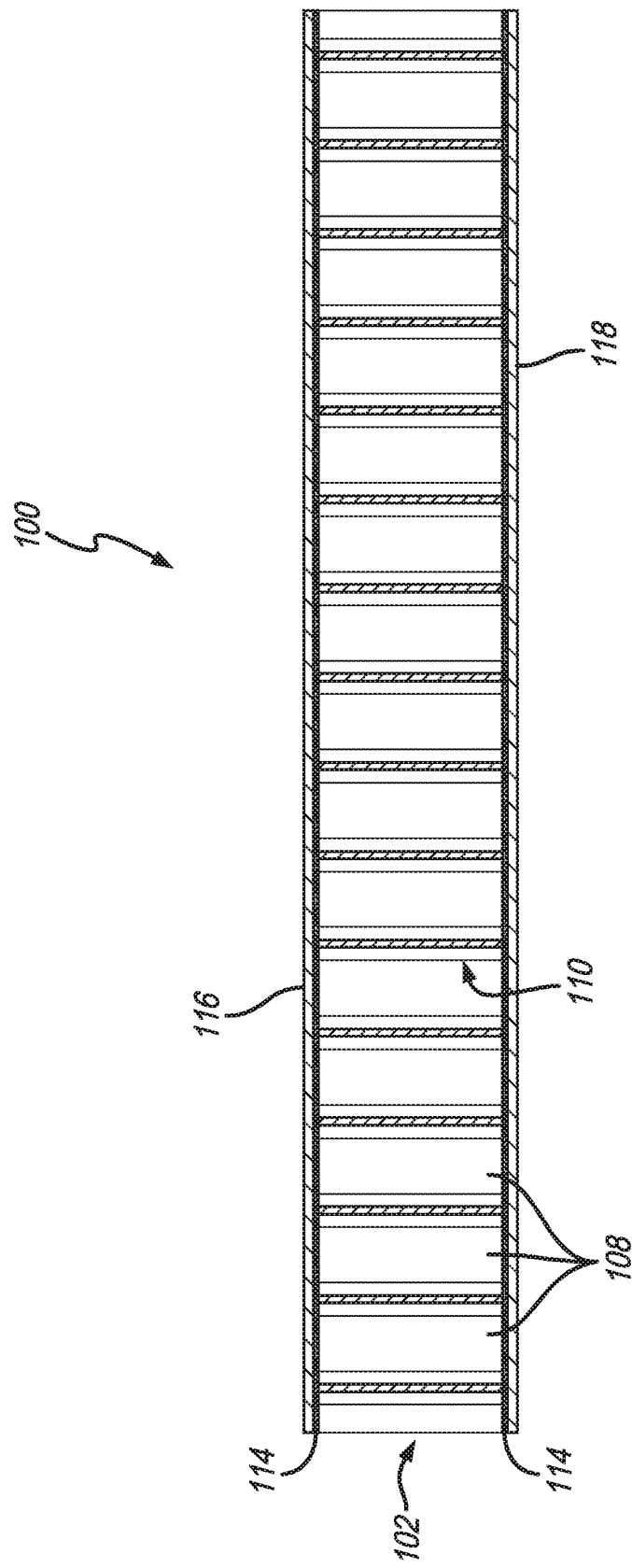
FIG. 2 is sectional view of the structure illustrated in FIG. 1 taken on line 2-2 in FIG. 1.

With reference to FIGS. 1 and 2, the present invention is for a system that includes a structure 100 comprising a honeycomb 102 having opposed surfaces, an upper surface 104 and a lower surface 106. The structure 100 comprises a plurality of open cells 108. Each cell 108 has an internal surface 110. There is a vibration damping coating 112 on at least a portion of the internal surface 110 of at least a portion of the cells 108. Optionally, substantially all of the internal surface 110 of substantially all of the cells 108 has the vibration damping coating 112 thereon.

The honeycomb 102 is a flexible or rigid structural material that comprises a plurality of closely packed geometric cells 108 that together form a lightweight honeycomb-shaped structure having high specific stiffness, high specific strength and unique energy-absorbing characteristics. Such honeycomb-shaped structures are well known in the art. As illustrated in FIGS. 1 and 2, the geometric shape of the cells 108 forming the honeycomb 102 can be hexagonal, similar to the structure of a natural honeycomb 102 constructed by bees. Alternately, the geometric shape of the packed cells 108 can be non-hexagonal. For example, the cells 108 can be circular, elliptical, triangular, square, rectangular, pentagonal, and octagonal or another suitable shape, including over-expanded structures of various geometric shapes. Also suitable are reinforced honeycomb and other regular or irregular cellular frameworks. Typically, the cross-section of each cell 108 defines an area with the maximum edge-to-edge distance of between about 0.125 inches to about 1 inch.

The honeycomb 102 is typically made from a lightweight material such as aluminum foil or paper. An aramid paper impregnated with a phenolic resin is commonly used for the honeycomb 102. Preferably the honeycomb 102 is made from a meta- or para-aramid fiber paper, sold under the trade name Nomex® or Kevlar®, respectively, both by DuPont. An aramid paper is impregnated with a heat resistant phenolic resin.

Typically, the honeycomb 102 has a thickness between about 0.125 inches to about 4 inches, depending upon the application of the structure 100 in which the honeycomb 102 is used. It is also typical for the honeycomb 102 to have a density between about 24 kg/m3 and about 200 kg/m3.

The vibration damping coating 112 is formed by curing a coating composition comprising an acrylic polymer or acrylic copolymer emulsion comprising polymeric particles and a vibration damping filler. The vibration damping coating 112 can be any thickness, but preferably the vibration damping coating 112 has a thickness of about 0.002 inches to about 0.015 inches.

The acrylic polymer or acrylic copolymer is a polymerization product of monomers based on esters of the acrylic acid (for example, butylacrylate, ethylhexylacrylate, methyl methacrylate etc.), comprising of either one type of monomer or multiple types. The acrylic polymer or acrylic copolymer is flexible at room temperature and can have a glass transition temperature of from about −40° C. to about 0° C. The viscosity of the acrylic polymer or acrylic copolymer emulsion is preferably less than 800 centipoise measured by Brookfield spindle #3 under 73° F. and 10 revolutions per minute. Preferably the acrylic polymer or acrylic copolymer emulsion has a pH greater than 7. For example, the acrylic polymer or acrylic copolymer emulsion is Vinavil® 4811 sold by Vinavil, having a place of business at Vinavil Americas, 1144 East Newport Center Drive, Deerfield Beach, Fla. 33442. The acrylic polymer or acrylic copolymer emulsion can comprise any weight percentage of the coating composition, but preferably the acrylic polymer or acrylic copolymer comprises a weight percentage of about 15 to about 40%.

The vibration damping filler can be selected from the group comprising mica, ceramic hollow spheres, calcium carbonate, barium sulfate, silicates, clays such as kaolin, and talc. Preferably the vibration damping filling comprises essentially of mica. Optionally, the mica comprises phlogopite mica sold under the trade name Suzorite® 200-HK by Imerys Performance Minerals, having a place of business at 100 Mansell Court East, Suite 300, Roswell, Ga. 30076. Preferably the vibration damping filler comprises a weight percentage of about 20 to about 40% of the coating composition, as measured before curing of the coating composition.

Generally, substantially all the mica particles are less than 300 microns in size. Optionally, no more than 3% by weight of the mica particles are greater than 300 microns in size. Because mica particles are irregular in shape, the term "size" means sieve size, the smallest sieve a particle will pass through.

The weight ratio of vibration damping filler to polymeric particles in the coating composition is typically from 2:1 to 8:1 and the vibration damping filler typically comprises at least about 15% by weight of the coating composition.

The structure 100 comprises sufficient vibration damping coating 112 to effectively reduce vibration. The reduction achieved by this invention can be expressed as one or more than one of the following:

a. the vibrational damping loss factor as measured by ASTM E756 is at least about 0.05 higher than that of the structure 100 without the vibration damping coating 112; and/or
b. sound transmission loss as measured by ASTM E90 is at least about 5 decibels higher than that of the structure 100 without the vibration damping coating 112.

The coating composition can include additional components such as one or more than one flame retardant, defoamer, thickener, and a liquid mixing component in addition to diluent.

Examples of an acceptable fire retardant are from families of brominated organics, phosphate or polyphosphates, zinc borates, aluminum or magnesium hydroxide, antimony trioxide or pentoxide, etc. Preferably the composition comprises tris (1,3-dichloroisopropyl) phosphate, sold under the trade name Fyrol® FR-2 by ICL, having a place of business at Millennium Tower, 23 Aranha Street, Tel Aviv 61070 Israel; decabromodiphenyl ethane, sold under the trade name Firemaster® 2100R by Great Lakes Solutions, having a place of business at 199 Benson Road, Middlebury, Conn. 06749; and/or antimony oxide, sold under the trade name Antimony Trioxide Microfine® AO3 by Chemtura Corporation, having a place of business at 199 Benson Road, Middlebury, Conn. 06749. Preferably the total amount of fire retardant can be from about 2 to about 7% weight of the coating composition.

Generally a defoamer is insoluble in the composition and has surface active properties. An essential feature of a defoamer product is a low viscosity and a facility to spread rapidly on foamy surfaces. Preferably the composition comprises water based defoamers, including mineral or vegetable oils and waxes that are long chain fatty alcohol, fatty acid soaps or esters. Optionally, an acetylenic-based additive sold under the trade name Surfynol® DF-37 by Air Products and Chemicals, Inc., having a place of business at 7201 Hamilton Blvd. Allentown, Pa. 18195-1501, is used. Typically the defoamer comprises a weight percentage of about 0.1 to about 1% of the coating composition before cure.

A thickener or thickening agent is a substance which can increase the viscosity of a liquid without substantially changing its other properties. Thickeners may also improve the suspension of other ingredients or emulsions which increases the stability of the product. An acceptable thickener can be chosen from chemically substituted cellulose, castor oil derivatives, organosilicons, fume silica, and/or clays such as bentonite and attapulgite. Optionally the composition comprises a synthetic layered silicate that incorporates an inorganic polyphosphate peptiser, sold under the trade name Laponite® RDS by Rockwood Additives Limited, having a place of business at Moorfield Road, Widnes, Cheshire, United Kingdom, WA8 3AA. Preferably the thickener comprises a weight percentage of about 0.1 to about 2% of the coating composition.

A liquid mixing component can be added to increase compatibility between ingredients, and it may also help film forming and regulate water evaporation rate. Glycol ethers or alcohols with medium boiling point are preferred in the composition. Optionally, ethylene glycol monobutyl ether, sold under the trade name Glycol Ether EB by Ashland, Inc., having a place of business at 5200 Blazer Parkway, Dublin, Ohio 43017. Preferably the liquid mixing component comprises a weight percentage of about 1 to about 5%.

The coating composition can also include a diluent as part of the emulsion. Diluents are liquids that are eventually evaporated along with any other volatile liquids during cure of coating composition, but adding diluent allows quick adjustment of total solids content in the composition. Preferably, the diluent is deionized water. Preferably the diluent comprises a weight percentage of about 10 to about 65%. This allows the solids content of the coating composition to be adjustable from about 30 to about 70% before cure.

The structure 100 can comprise an adhesive 114 coupled to both the upper surface 104 and the lower surface 106 of the honeycomb 102. Typically, the adhesive 114 is selected from the group of hot-melt film adhesives, including thermoset types such as epoxies, phenolics, polyurethanes, and bismaleic imides, and thermoplastic types such as polyamide, polyester and polyimide. Preferably, the adhesive 114 comprises an epoxy based thermoset adhesive film. The adhesive 114 is used to hold in place a first piece of sheathing 116 coupled at the upper surface 104 of the honeycomb 102 and a second piece of sheathing 118 coupled to the lower surface 106 of the honeycomb 102.

The first and second pieces of sheathing 116, 118 can be selected from monolithic sheets or fiber reinforced composites. Monolithic sheets can be metal ones such as aluminum or steel, wood laminates, extruded plastic sheets, and/or ceramics. Fiber reinforced composites typically include carbon fiber reinforced polymers, fiberglass reinforced plastics, aramid fiber reinforced polymers, and natural fiber reinforced plastics. Preferably the sheathing 116, 118 is an aluminum sheet or fiber reinforced polymer composite. The first and second pieces of sheathing 116, 118 preferably are about 0.005 inches thick to about 0.1 inches thick, depending on the application the structure 100 is being used for.

When the structure 100 comprises the honeycomb 102, the vibration damping coating 112, the adhesive layers 114 and the first and second pieces of sheathing 116, 118, the structure 100 can be from about 0.125 inches thick to about 4 inches thick.

The structure 100 can be made in any dimensions up to about 4 feet wide and 12 feet long. One typical application for the structure 100 is to be cut and fabricated into aircraft flooring panels.

The structure 100 translates into better vibration damping. The peak loss factor is the metric of the vibration damping property of a structure, measured by ASTM E756. When tested under ASTM E756, the structure 100 of the present invention, having sufficient vibration damping coating 112 to increase the density of the honeycomb by at least 4 pounds per cubic foot, provides a change in loss factor of the damped structure 100 compared to the non-damped structure of at least 0.05, preferably at least 0.1 and most preferably at least 0.15, at ambient room temperature and ambient room humidity. This can significantly increase the comfort level of the passengers, for example, in an aircraft installed with flooring panels made of the damped/coated structure 100.

The structure 100 also translates into better noise insulation. Sound Transmission Loss (STL) is the metric of the noise insulation property of a structure, measured by ASTM E90. The structure 100 of the present invention, having sufficient vibration damping coating 112 to increase the density of the honeycomb by at least 4 pounds per cubic foot, provides STL values of at least 5 decibels (dB), preferably at least 10 dB, and most preferably at least 25 dB higher than the uncoated base panel.

The amount of vibration damping coating typically increases the density of the structure by at least 4 pounds per cubic foot, preferably by at least 10 pounds per cubic foot, and most preferably by at least 20 pounds per cubic foot. The total amount of vibration damping coating used is limited by the volume available in the honeycomb cells, and the adverse effect on airplane weight. At these preferred amounts, the noise level in a passenger cabin installed with flooring panels made of the damped/coated structure 100 is significantly reduced without an undue weight penalty. Again, a quiet cabin increases the comfort and satisfaction level of passengers riding an airplane.

One method of coating the honeycomb 102 and the internal surface 110 of the cells 108 with the vibration damping coating comprises the step of moving the honeycomb 102 through a downwardly cascading waterfall, wherein the waterfall comprises the vibration damping coating. The moving of the honeycomb 102 through the downwardly cascading waterfall can be accomplished by disposing the honeycomb 102 on a wheeled cart disposed upon a pair of opposed rails. The waterfall of vibration damping coating 112 is provided by an incoming precursor header having a slotted terminus disposed above the rails. Excess vibration damping coating is captured in a catch tray. Typically, excess vibration damping coating is blown downwardly and out of the cells 108 by a compressed gas, such as compressed air, blowing through downwardly disposed nozzles in the terminus of a compressed gas header located downstream of the incoming vibration damping coating header.

In an alternative method of coating the honeycomb 102 and the internal surface of the cells 108 with the vibration damping coating 112, the honeycomb 102 is held stationary while the downwardly cascading waterfall is moved laterally with respect to the honeycomb 102 by an overhead crane. Also mounted on the crane are downwardly disposed nozzles which blow a compressed gas downwardly into the honeycomb 102 to blow out excess vibration damping coating 112 from the cells 108. Optionally, excess vibration damping coating 112 is captured in a catch tray disposed below the honeycomb 102 and is recycled to the incoming vibration damping coating via a recycle line and a recycle pump.

In another alternative method of coating the honeycomb 102 and the internal surface of the cells 108 with the vibration damping coating 112, the honeycomb 102 is first submerged completely in a pool of vibration damping coating material 112. Then the honeycomb 102 is lifted out of the pool at a controlled rate. Once the honeycomb 102 is entirely out of pool it is rested on a support with a substantially porous surface, and an air blowing nozzle similar to the crane mounted one described above is applied over the honeycomb 102 to blow out excess vibration damping coating 112 from the cells 108. Optionally, excess vibration damping coating 112 is captured in a catch tray disposed below the honeycomb 102 and is recycled.

Optionally, the vibration damping coating 112 can be sprayed onto the honeycomb 102.

After the internal surfaces 110 of the cells 108 are coated with the vibration damping coating 112, the honeycomb 102 is brought to a drying hood where strong air flow is forced through every honeycomb cell 108. At this drying step, a substantial portion of the carrier liquid in the vibration damping coating 112 (water, any other volatile liquids, etc.) is removed by evaporation and the remainder of the vibration damping coating 112 clings to the internal surfaces 110 of the cells 108 as a thin layer of solid residue. This residue must be sufficiently adherent to the internal surfaces 110 of the cells 108 so as to not be displaced during subsequent handling of the honeycomb 102. Preferably, the honeycomb 102 is further subjected to hot air of about 250° F. for extended hours, such that the vibration damping coating 112 residue on the internal surfaces 110 of the cells 108 is completely dried and cured.

Typically, the amount of vibration damping coating 112 retained on the internal surfaces 110 of the cells 108 is controlled by adjusting the vibration damping coating 112 formulation. Alternatively, if a higher amount of vibration damping coating 112 is desired, the above described coating-drying cycle can be repeated on the same honeycomb 102.

Where the first and second pieces of sheathing 116, 118 comprise a fiber reinforced plastic, fibrous reinforcements impregnated with half-cured thermoset resins ("prepregs") are typically used, and the adhesion of the first and second pieces of sheathing 116, 118 to the honeycomb 102 can be achieved by curing the resin in the prepregs or by the use of adhesives, such as polyamide or epoxy adhesives. Where the first and second pieces of sheathing 116, 118 are made of aluminum sheets and/or fully cured laminates, an adhesive layer 114 typically is used to bond the first and second pieces of sheathing 116, 118 to the honeycomb 102. This bonding step typically comprises subjecting the structure 100 to a temperature of at least 250° F. and a pressure of at least 30 psi for at least 30 minutes.

Example 1

A water based vibration damping composition 112 was prepared by combining about 45% deionized water; about 1% Laponite® (Rockwood Additives, United Kingdom); about 20% Vinavil® 4811 (Vinavil Americas, FL); about 0.1% Surfynol® DF-37 (Air Products and Chemicals, Inc., PA); about 4% Glycol Ether EB (Ashland, Inc., OH); about 2% Fyrol® FR-2 (ICL, Israel); about 2% Firemaster® 2100R (Great Lakes Solutions, CT); about 0.3% BurnEx™ (Nyacol Nanotechnologies, MA); and about 27% Suzorite® 200-HK (Imerys Performance Minerals, GA). This composition had a solids content of about 45%, and a Brookfield viscosity of about 800 cP (spindle #3, 10 RPM, 73° F.).

Example 2

A water based vibration damping composition 112 was prepared by combining about 45% deionized water; about 1% Laponite®; about 20% Vinavil® 4811; about 0.1% Surfynol® DF-37; about 4% Glycol Ether EB; about 4% Firemaster® 2100R (Great Lakes Solutions, CT); about 0.8% Antimony Trioxide (Chemtura Corporation, CT); and about 27% Suzorite® 200-HK (Imerys Performance Minerals, GA). This composition had a solids content of about 45%, and a Brookfield viscosity of about 900 cP (spindle #3, 10 RPM, 73° F.).

Example 3

The structure 100 was formed by first coating the honeycomb 102 with the vibrational damping coating 112 of Example 1 by moving a downwardly cascading waterfall of vibrational damping coating 112 over the honeycomb 102. Next, downwardly disposed nozzles blew a compressed gas downwardly into the honeycomb 102 blowing out excess vibration damping coating 112 from the cells 108. The coated honeycomb 102 was then dried and cured by being placed under a drying hood where a strong air flow was forced through every honeycomb cell 108. Next, the coated honeycomb 102 was further subjected to hot air of about 250° F. for extended hours, such that the vibration damping coating 112 residue on the internal surfaces 110 of the cells 108 was completely dried and cured.

Then adhesive 114 was applied to the upper and lower surfaces 104, 106 of the honeycomb 102, and then the first and second pieces of sheathing 116, 118 were applied to the adhesive 114. The assembled structure 100 was then subjected to a temperature of at least 250° F. and a pressure of at least 30 psi for at least 30 minutes.

Although the present invention has been described in considerable detail with reference to certain preferred embodiments, other embodiments are possible. For example, although the system has been described for use in aircraft, other applications are possible such as boats, ships, and land vehicles. Therefore, the scope of the appended claims should not be limited to the description of preferred embodiments contained in this disclosure.

What is claimed is:

1. A structure for use as airplane flooring comprising:
   a) a honeycomb having opposed surfaces and a plurality of open cells, each cell having an internal surface; and
   b) a vibration damping coating being about 0.002 inches to about 0.015 inches thick on substantially all of the internal surface of substantially all of the cells, the coating being formed by curing a coating composition comprising:
      (i) acrylic copolymer emulsion comprising polymeric particles, the emulsion having a glass transition temperature of from about −40° C. to about 0° C. and a viscosity less than 800 centipoise measured by Brookfield spindle #3 under 73° F. and 10 revolutions per minute;
      (ii) a flame retardant; and
      a vibration damping filler consisting of mica,
      wherein the weight ratio of mica to polymeric particles is from 2:1 to 8:1, wherein the mica comprises a plurality of particles and no more than 3% by weight of the particles are greater than 300 microns in size, and wherein the structure comprises sufficient vibration damping coating that the structure satisfies at least one of the following criteria:
         a) sound transmission loss as measured by ASTM E90 of at least about 5 decibels as compared to the structure without the vibration damping coating; or
         b) vibrational damping loss factor as measured by ASTM E756 of at least about 0.05 as compared to the structure without the vibration damping coating;

c) an adhesive coupled to both surfaces of the honeycomb;
d) a first piece of sheathing coupled to the adhesive coupled on one of the surfaces of the honeycomb; and
e) a second piece of sheathing coupled to the adhesive coupled to the other surface of the honeycomb.

2. The structure of claim 1 installed as airplane flooring.

3. The structure of claim 1, wherein substantially all of the internal surface of substantially all of the cells have the vibration damping coating thereon.

4. The structure of claim 1 sized for an airplane floor.

5. The structure of claim 1 wherein the first and second pieces of sheathing are formed of a material selected from the group comprising aluminum and fiber reinforced polymer.

6. The structure of claim 5 wherein each of the first and second pieces of sheathing comprises a thickness from about 0.005 inches to about 0.1 inches.

7. The structure of claim 1 comprising sufficient vibration damping coating to increase the density of the structure by at least 4 pounds per cubic foot compared to the structure without the vibration damping coating.

8. The structure of claim 1 further comprising at least one of the following: a defoamer, a thickener, and a liquid mixing component.

9. A structure for use as airplane flooring comprising:
a) a honeycomb having opposed surfaces and a plurality of open cells, each cell having an internal surface; and
b) a vibration damping coating being about 0.002 inches to about 0.015 inches thick on substantially all of the internal surface of substantially all of the cells, the coating being formed by curing a coating composition consisting essentially of:
(i) acrylic copolymer emulsion comprising polymeric particles, the emulsion having a glass transition temperature of from about −40° C. to about 0° C. and a viscosity less than 800 centipoise measured by Brookfield spindle #3 under 73° F. and 10 revolutions per minute;
(ii) a flame retardant; and
(iii) a vibration damping filler consisting of mica,
wherein the weight ratio of mica to polymeric particles is from 2:1 to 8:1, wherein the mica comprises a plurality of particles and no more than 3% by weight of the particles are greater than 300 microns in siz, and wherein the structure comprises sufficient vibration damping coating that the structure satisfies at least one of the following criteria:
a) sound transmission loss as measured by ASTM E90 of at least about 5 decibels as compared to the structure without the vibration damping coating; or
b) vibrational damping loss factor as measured by ASTM E756 of at least about 0.05 as compared to the structure without the vibration damping coating;
c) an adhesive coupled to both surfaces of the honeycomb;
d) a first piece of sheathing coupled to the adhesive coupled on one of the surfaces of the honeycomb; and
e) a second piece of sheathing coupled to the adhesive coupled to the other surface of the honeycomb.

10. The structure of claim 9 installed as airplane flooring.

11. The structure of claim 9 wherein substantially all of the internal surface of substantially all of the cells have the vibration damping coating thereon.

12. The structure of claim 9 sized for an airplane floor.

13. The structure of claim 9 wherein each of the first and second pieces of sheathing is formed of a material selected from the group consisting of aluminum and fiber reinforced polymer.

14. The structure of claim 13 wherein each of the first and second pieces of sheathing comprises a thickness from about 0.005 inches to about 0.1 inches.

15. The structure of claim 9 comprising sufficient vibration damping coating to increase the density of the structure by at least 4 pounds per cubic foot compared to the structure without the vibration damping coating.

16. The structure of claim 9 further comprising at least one of the following: a defoamer, a thickener, and a liquid mixing component.

17. The structure of claim 9 wherein the flame retardant is tris(1,3 dichloroisopropyl) phosphate.

18. The structure of claim 1 wherein the flame retardant is tris(1,3 dichloroisopropyl) phosphate.

19. The structure of claim 1 wherein the structure comprises sufficient vibration damping coating that the structure has a sound transmission loss as measured by ASTM E90 is at least about 5 decibels as compared to the structure without the vibration damping coating.

20. The structure of claim 1 wherein the structure comprises sufficient vibration damping coating that the structure has a vibrational damping loss factor as measured by ASTM E756 is at least about 0.05 as compared to the structure without the vibration damping coating.

21. The structure of claim 9 wherein the structure comprises sufficient vibration damping coating that the structure has a sound transmission loss as measured by ASTM E90 of at least about 5 decibels as compared to the structure without the vibration damping coating.

22. The structure of claim 9 wherein the structure comprises sufficient vibration damping coating that the structure has a vibrational damping loss factor as measured by ASTM E756 of at least about 0.05 as compared to the structure without the vibration damping coating.

* * * * *